United States Patent [19]
Bradford et al.

[11] Patent Number: 5,925,245
[45] Date of Patent: Jul. 20, 1999

[54] FILTER ARRANGEMENT

[75] Inventors: Peter Francis Bradford, Sheerness; David John Cunningham Law, Ealing, both of United Kingdom

[73] Assignee: Lucas Industries, United Kingdom

[21] Appl. No.: 09/049,269

[22] Filed: Mar. 27, 1998

[30]  Foreign Application Priority Data

Apr. 8, 1997 [GB] United Kingdom .................... 9707218

[51] Int. Cl.⁶ ............................ B01D 35/30; B01D 27/08
[52] U.S. Cl. ......................... 210/232; 210/235; 210/444; 210/450; 210/236; 55/502; 55/503
[58] Field of Search ................................... 210/232, 238, 210/443, 444, 450, 440, 235, 236; 55/508, 503, 502

[56]  References Cited

U.S. PATENT DOCUMENTS 3,399,776  9/1968  Knuth .
4,416,775  11/1983  Halbich .
4,904,382  2/1990  Thomsen .

Primary Examiner—Thomas M. Lithgow
Attorney, Agent, or Firm—Michael Best & Friedrich LLP

[57]  ABSTRACT

A filter arrangement comprises a filter head and a filter body. The filter body and filter head are provided with components arranged to cooperate with one another to permit the filter body to be secured to the filter head by sliding the filter body in a lateral direction thereof relative to the filter head.

9 Claims, 4 Drawing Sheets

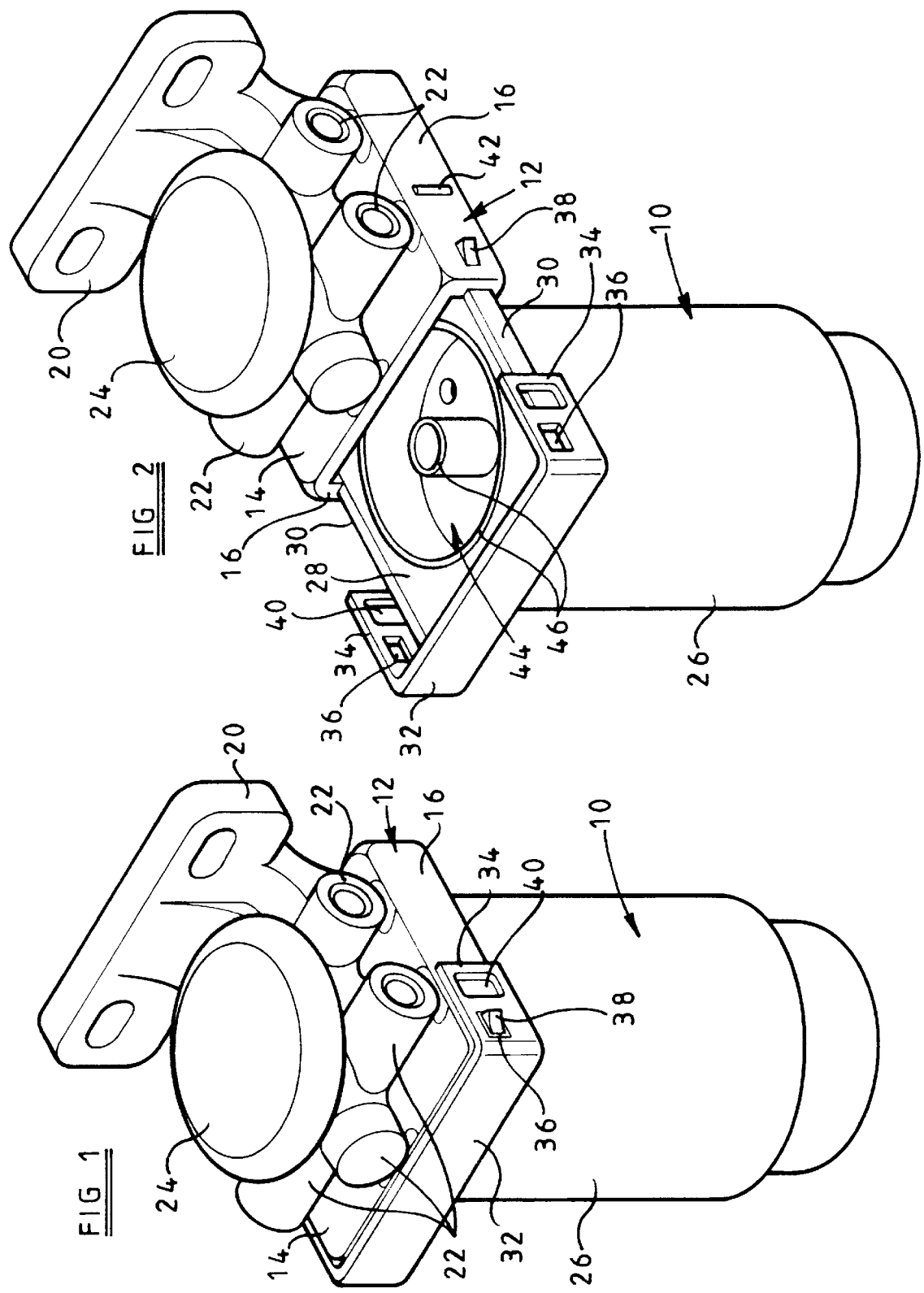

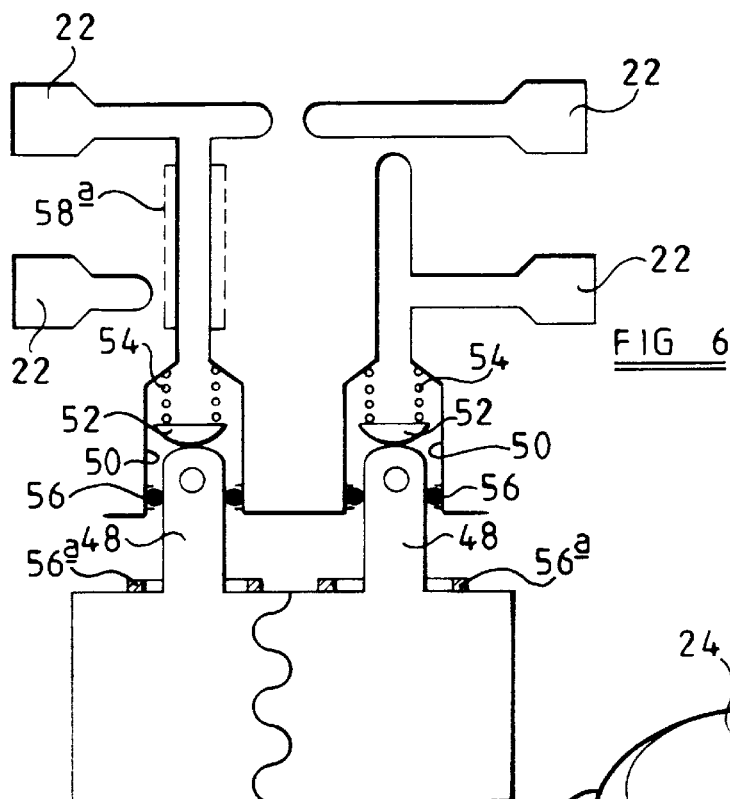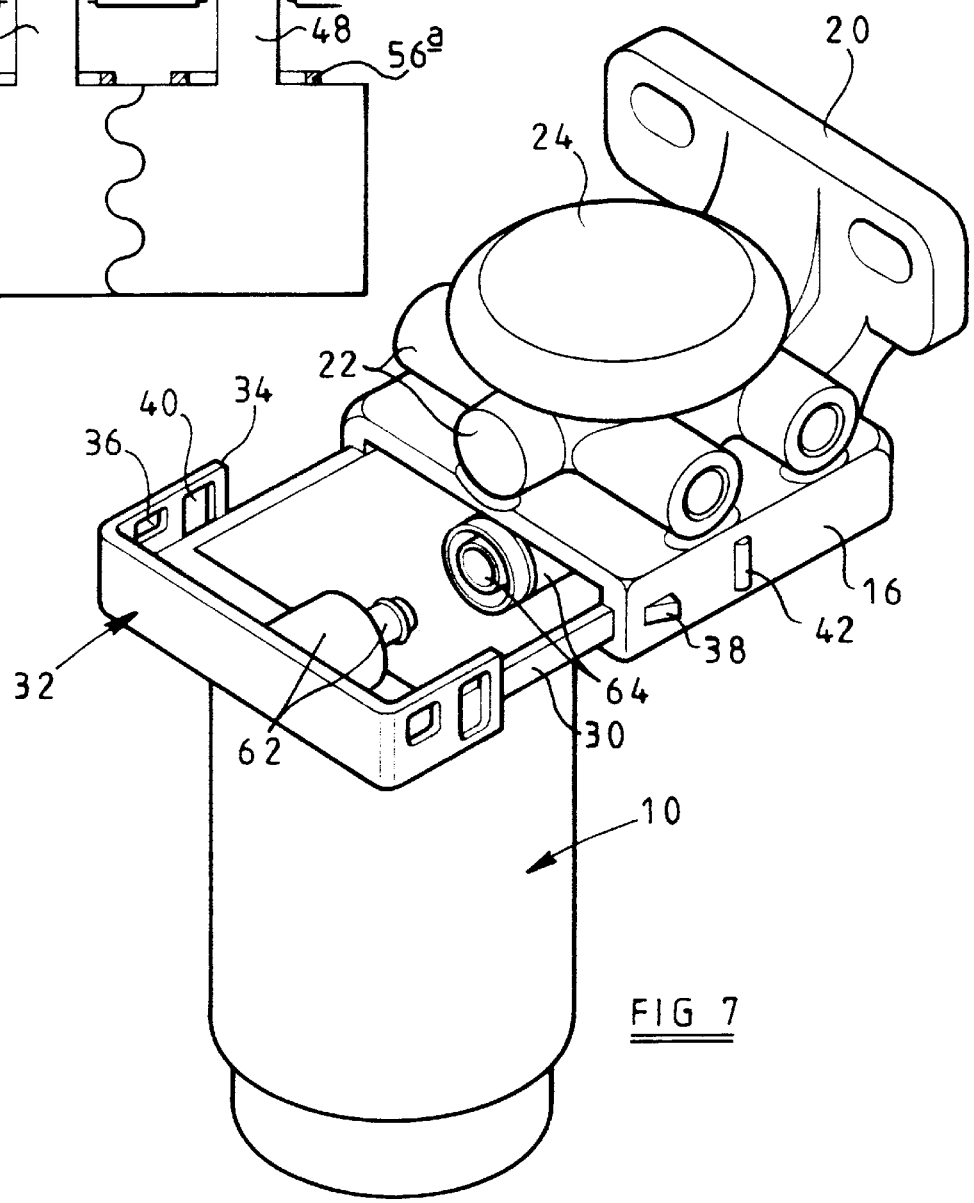

FILTER ARRANGEMENT

BACKGROUND OF THE INVENTION

This invention relates to a filter arrangement comprising a filter body arranged to be secured to a filter head, and in particular to a simple technique for securing the filter body to the filter head.

A number of techniques are known for securing filter bodies to filter heads, for example the filter head may include an externally screw-threaded projection which is received within a screw-threaded opening provided in the filter body, or the head and body may include cooperating bayonet-type fittings to permit the body to be secured to the filter head.

SUMMARY OF THE INVENTION

It is an object of the invention to provide a filter arrangement of the type defined hereinbefore of relatively simple form.

According to the present invention there is provided a filter arrangement comprising a filter head and a filter body, the filter head and filter body being provided with components cooperable with one another to permit the filter body to slide with respect to the filter head in a lateral direction between a first, disengaged position and a second, operative position in which the filter body is in sealing engagement with the filter head.

The filter head and filter body conveniently include cooperating retainer means whereby movement of the filter body away from its second position is restricted.

The invention will further be described, by way of example, with reference to the accompanying drawings, in which:

BRIEF DESCRIPTION OF THE DRAWINGS

FIG. 1 is a perspective view of a filter arrangement in accordance with an embodiment of the invention;

FIG. 2 is a perspective view of the arrangement of FIG. 1 with the filter body partially withdrawn from the filter head;

FIG. 6 is a diagrammatic view illustrating operation of the embodiment of FIG. 5; and FIG. 7 is a view similar to FIG. 2 of a further embodiment.

DETAILED DESCRIPTION OF THE PREFERRED EMBODIMENTS

Figure 3:
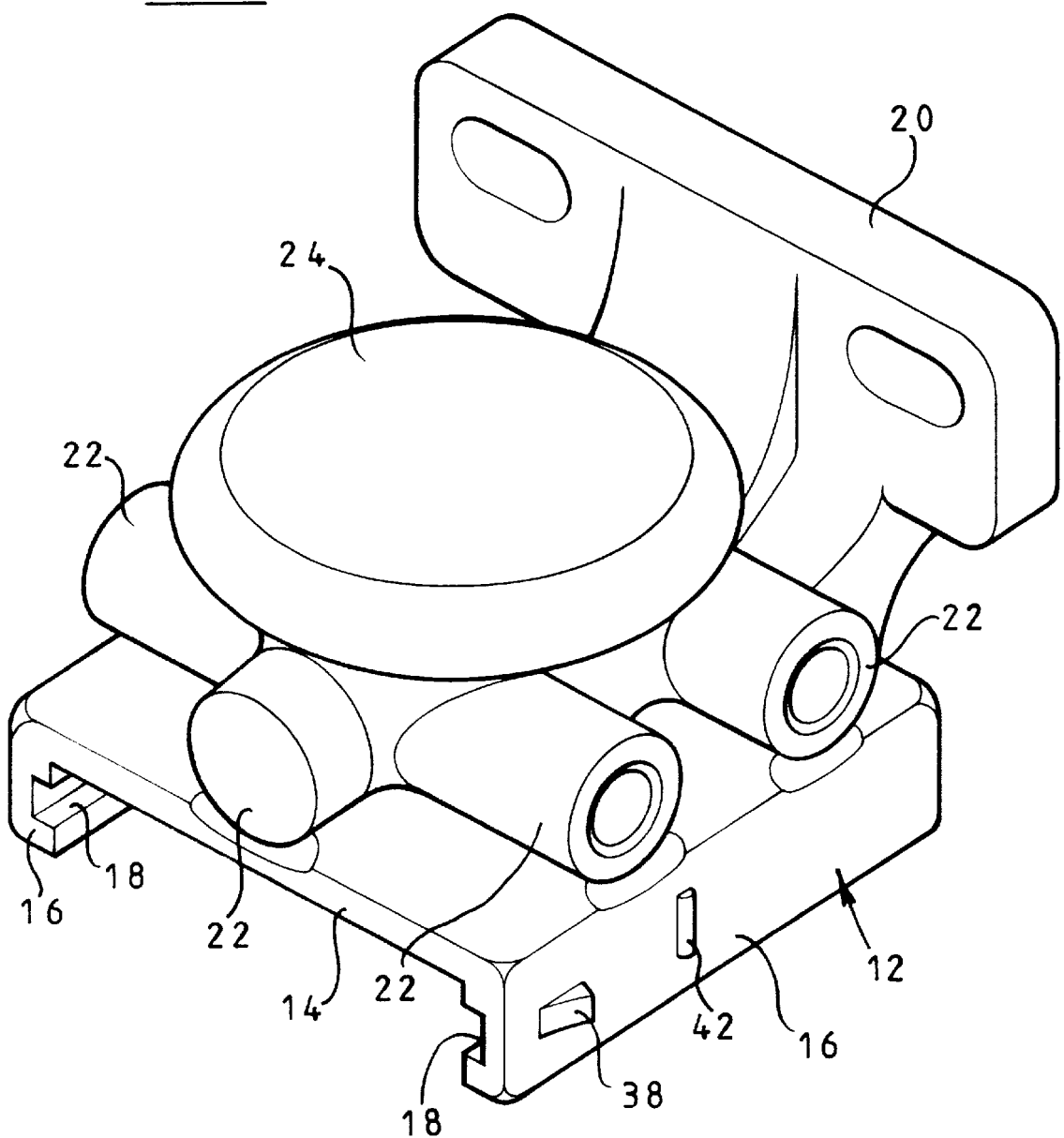
FIG. 3 is a perspective view of the filter head of the FIG. 1 arrangement.

The filter arrangement illustrated in FIGS. 1 to 3 comprises a filter body 10 which, in use, is secured to a filter head 12. The filter head 12 comprises a base 14 of substantially rectangular cross-section, and having a pair of downwardly extending walls 16. The inner surface of each wall 16 is provided with a channel 18 of substantially rectangular cross-section extending across substantially the complete width of the wall 16, but terminating short of a rear edge of the wall 16. The base 14 is integral with a bracket 20 for use in mounting the filter arrangement in an appropriate position.

The upper surface of the base 14 carries a plurality of ports 22 whereby the filter head 12 is connected, in use, to other parts of a fuel system of an engine. The filter head 12 further comprises a priming arrangement 24 for priming the filter, although depending upon the intended use the priming arrangement may be omitted.

The filter body comprises a generally cylindrical member 26 having, at its upper end, a flange 28 of substantially rectangular shape. The flange 28 is provided with a pair of projections 30 which are shaped to be received with the channels 18 in a sliding manner to secure the filter body 10 to the filter head 12. The filter body 10 further carries a strap 32 including a pair of arms 34 provided with openings 36 which, when the filter body 10 is in the position illustrated in FIG. 1, locate around ramped projections 38 provided on the external surfaces of the walls 16 to secure the filter body 10 to the filter head 12. The arms 34 are further provided with openings or recesses 40 to assist removal or attachment of the filter body 10 and provide an indication of when the filter body is correctly positioned. The external surfaces of the walls 16 are further provided with features 42 to assist in determining when the filter body 10 is correctly located with respect to the filter head 12. The strap 32 may be integral with the flange 28, or may be a separate integer. Conveniently, the strap 32 includes a flat region suitable for carrying, for example, a label indicating the manufacturers name and/or part number.

In an alternative arrangement, the positions of the openings 36 and openings 40 are reversed to avoid the projections 38 locating in the openings 40 to provide an erroneous indication that the filter body is correctly positioned. In a further alternative, the openings 40 may take the form of cut outs located at the ends of the strap 32, again avoiding erroneous indications that the filter body is correctly positioned. In further alternative embodiments, the openings 40 may be replaced by projecting features in the form of, for example, knobs or tabs, and instead of using openings 36 in the strap 32 in conjunction with the projections 38 to retain the filter body in position, other types of retainer may be used, for example knurled finger knobs, spring loaded pins, toggles or spring clips could be used.

As illustrated in FIG. 2, the filter body 10 houses a filter cartridge 44 which is of substantially cylindrical shape, and comprises upper and lower support plates connected to one another by an axially extending tube. The upper and lower support plates locate a pleated paper filter medium therebetween, for example in the form of a coil. In use, fuel flows from above the upper support plate through openings provided therein to the filter medium, through the filter medium and through openings provided in the lower support plate to the lower end of the filter body 10. The fuel then flows upwardly through the axially extending tube of the filter cartridge 44. As illustrated in FIG. 2, the axially extending tube projects above the upper surface of the upper support plate, and defines with the filter body 10 an annular chamber, a central chamber being located within the axially extending tubular member. Appropriate seal members 46 are provided to ensure that, when the filter body 10 is in the position illustrated in FIG. 1, fuel is only able to pass from the annular chamber to the central chamber via the filter medium. It will be appreciated that other types of filter cartridge can be used, for example cartridges containing a star-like type pleated paper filter medium.

The annular chamber is of relatively large volume, and it is intended that this chamber should house an annular fuel heater, thus the volume of this chamber which is available for occupation by fuel is significantly more restricted than appears to be the case. If no heater is required, then an annular member may be located in the chamber in order to reduce the volume of the chamber available for occupation by fuel. It will be understood that rather than locate the heater in this chamber, the heater may be located in the filter head.

Although not illustrated, prior to securing the filter body 10 to the filter head 12, appropriate drillings are provided in the filter head 12 to permit communication between selected ones of the ports 22 and parts of the lower surface of the base 14 which communicate, in use, with the annular chamber and the central chamber, respectively. Once those drillings have been provided, the filter body 10 is secured to the filter head 12 by inserting the projections 30 into the channels 18, and sliding the filter body 10 in a direction perpendicular to the axis of the filter body 10 until the position illustrated in FIG. 1 is achieved. In this position, the projections 38 are received within the openings 36. It will be appreciated that in order to achieve this position, the arms 34 of the strap 32 are deflected outwards as the arms 34 ride over the projections 38. Subsequently, should it be necessary to remove the filter body 10 from the filter head 12, for example for maintenance or replacement of the filter cartridge, the arms 34 are deflected outwardly until the projections 38 are released from the openings 36, and once this position has been achieved, the filter body 10 can be withdrawn from the filter head 12 by applying an appropriate force to the strap 32 or cylindrical part of the filter body 10.

Figure 4A:
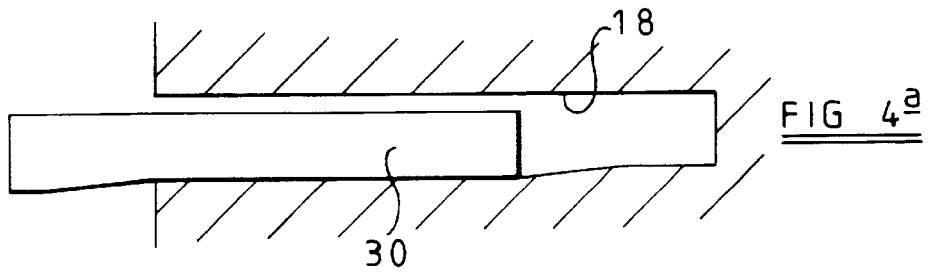
FIGS. 4a and 4b are diagrammatic views of a modification.
Figure 4B:
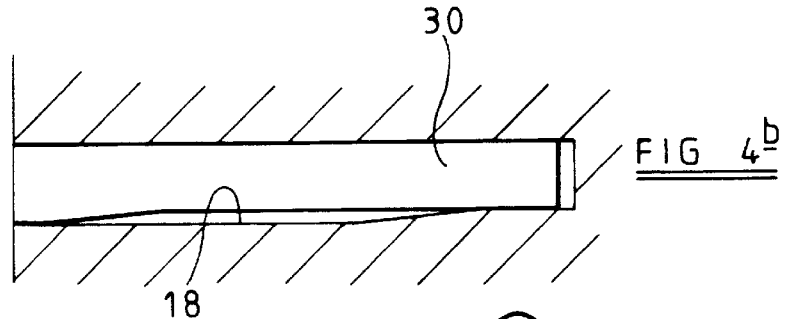

In this embodiment, an appreciable force is required to slide the filter body 10 with respect to the filter head 12, as throughout substantially the complete movement of the filter body 10, the seal members 46 are in engagement with the lower surface of the base member 14. FIGS. 4a and 4b illustrate a modification of the arrangement illustrated in FIGS. 1 to 3 in which the force which must be applied to the filter body 10 in order to secure the filter body 10 to the filter head 12 is reduced. In this arrangement, the channels 18 and projections 30 are both shaped to include ramped regions. As illustrated in FIG. 4a, during a first part of the movement of the filter body 10 with respect to the filter head 12, the upper surface of the projection 30 is spaced from the upper surface of the channel 18, and the seal members 46 are similarly spaced from the lower surface of the base member 14. Once the filter body 10 reaches the position in which the projections 30 occupy the position illustrated in FIG. 4a, further movement of the projections 30 into the channels 18 result in both horizontal and vertical movement, such movement resulting in the seal members 46 moving into engagement with the lower surface of the base member 14. Such movement continues until the filter body 10 is fully inserted into the filter head 12 as illustrated in FIG. 4b. It will be appreciated that in this modification, as only a relatively small amount of the horizontal movement of the filter body 10 occurs once the seal members 46 engage the base member 14, the work involved in securing the filter body 10 to the filter head 12 or removing the filter body 10 from the filter head 12 is reduced.

Rather than using ramped regions to reduce the force required to secure or remove the filter body 10, other arrangements using cams, threaded arrangements or tapered slides may be used.

Although in the description hereinbefore, the filter cartridge 44 is described as being a separate integer, it will be appreciated that the filter body 10 may include an integral filter arrangement rather than a separate filter cartridge. Further, it will be appreciated that the filter may be arranged for fuel to flow through the filter medium in the reverse direction to that described hereinbefore, and indeed fuel may be filtered whilst flowing in a radial rather than axial direction.

Figure 5:
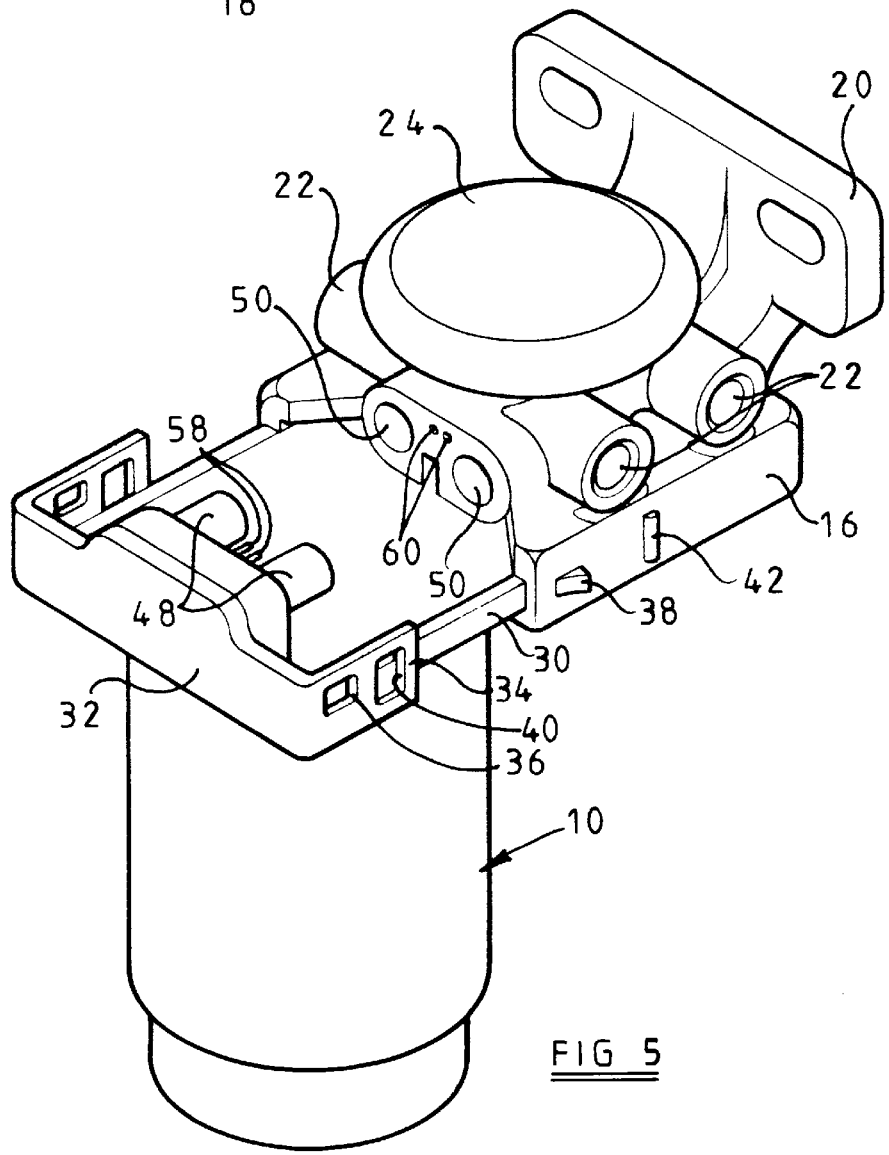
FIG. 5 is a view similar to FIG. 2 of an alternative embodiment.

The arrangement illustrated in FIG. 5 is similar to that of FIGS. 1 to 3, but instead of providing seal members on the upper surface of the filter body 10 which, in use, engage the lower surface of the base 14, the filter body 10 is provided with a pair of tubular projections 48 which extend in a direction parallel to the direction of sliding movement of the filter body 10 with respect to the filter head 12. The projections 48 are arranged to be received within correspondingly shaped and appropriately oriented openings 50 provided in the filter head 12 which communicate with selected ones of the ports 22. As illustrated diagrammatically in FIG. 6, each opening 50 includes a valve member 52 which is biased by means of a spring 54 into engagement with a seal ring 56 located within the opening 50. When the filter body 10 is not secured to the filter head 12, the valve members 52 are biased into engagement with the seal rings 56 thus fuel is not permitted to escape from the filter head through the openings 50. Upon securing the filter body 10 to the filter head 12, the projections 48 displace the valve members 52 against the action of the springs 54, the projections 48 sealing against the seal rings 56 to prevent fuel from escaping between the filter head and the filter body, the displacement of the valve members 52 permitting fuel to flow between the selected ones of the ports 22 via the filter medium located within the filter body 10.

In a modification to this embodiment, one or both of the projections may be provided on the filter head, the corresponding opening(s) being provided in the filter body. Further, other types of valve may be used or the valve may be omitted. In another modification, rather than use the seal rings of the valve to provide a seal between the filter head and filter body, appropriate annular seal members may be carried by the filter body as denoted by 56a in FIG. 6.

As described hereinbefore, the selection of which port to connect to the fuel supply, and which port forms the outlet of the filter is dependent upon the intended use of the filter, the openings 50 being selectively communicable which each of the ports 22 by providing appropriate drillings in the filter head. Further, clean or dirty side return lines can be connected, if desired.

The filter body 10 conveniently houses a fuel heater arrangement, and in the arrangement illustrated in FIG. 5, the heater arrangement is conveniently electrically connected via terminal members 58 carried by the filter body 10, the terminal members 58 being receivable within openings 60 provided in the filter head 12, the openings 60 containing contacts arranged to engage the terminal members 58, in use. As described hereinbefore, if desired the heater may be located within the filter head (as indicated at 58a in FIG. 6), or omitted, and an appropriate insert located within the annular chamber.

The arrangement illustrated in FIG. 7 is similar to that of FIG. 5 but rather than including a pair of parallel projections 48, the filter body 10 is provided with coaxial tubes 62 which are arranged to seal, in use, with a similar pair of coaxial tubes 64 carried by the filter head 12. As illustrated in FIG. 7, appropriate seal rings are provided on the inner tube carried by the filter housing 10 and outer tube carried by the filter head 12. It will be appreciated, however, that alternative sealing arrangements may be possible.

In the arrangement illustrated in FIG. 5, the projections 48 communicate, respectively, with the clean and dirty sides of the filter medium. Similarly, in the FIG. 7 arrangement, the projections 62 communicate, respectively, with the clean and dirty sides of the filter medium. Further, although not illustrated in FIG. 7, appropriate terminals may be provided to permit electrical connection of a fuel heater located within the filter body 10.

In each of the embodiments described hereinbefore, the channels 18 and projections 30 are of substantially rectangular cross-sectional shape. It will be appreciated that other shapes may be used. Further, the projections may be provided on the filter head and channels on the filter body, if desired.

Although in the embodiments described hereinbefore the filter body is of substantially cylindrical form and slides laterally with respect to the filter head, in a direction perpendicular to the axis of the filter body to locate the filter body, it will be appreciated that other shapes of filter body may be used, for example filter bodies of substantially square or rectangular cross-section, possibly with rounded corners.

In the embodiments described hereinbefore, the sliding movement of the filter body occurs in a direction either parallel to or perpendicular to the axes of the mating components, ie those parts of the filter head and body which must register with one another to permit fuel flow to and from the filter cartridge. Arrangements are envisaged in which the axes of the mating components are at other angles to the direction of sliding movement.

It will be appreciated that other modifications to the described embodiments can be made, for example the seals may be replaced by a substance of the type which expands when exposed to diesel fuel. Where such a substance is used, location of the filter body requires relatively little effort as the substance is of relatively small volume and does not impede movement of the filter body. Once correctly located, the application of fuel to the substance in use causes the substance to expand forming a seal between the filter body and filter head.

We claim:

1. A filter arrangement comprising a filter head and a filter body defining an axis, the filter head being provided with components slidably cooperable with components provided on the filter body to permit the filter body to slide with respect to the filter head in a lateral direction of the axis of the filter body between a first, disengaged position in which the filter body and filter head are separate, and a second, operative position in which the filter body is in sealing engagement with the filter head, and wherein the components of the filter body and the filter head are shaped to include first and second ramped regions, said first part of said ramped regions allows relative movement between the head and body in which seal means are spaced from an opposed surface allowing reduced forces to cause relative movement between the head and the body and a second part of said ramped regions in which the body moves laterally and towards the head to compress the seal means therebetween.

2. A filter arrangement as claimed in claim 1, further comprising retainer means restricting movement of the filter body away from its second position.

3. A filter arrangement as claimed in claim 2, wherein the retainer means comprises a strap forming part of the filter body which is arranged to cooperate, in use, with projections associated with the filter head.

4. A filter arrangement as claimed in claim 1, wherein the components of the filter body and filter head are shaped to include ramped regions causing movement of the filter body towards the filter head to compress seal means located therebetween.

5. A filter arrangement comprising a filter head and a filter body defining an axis, the filter head being provided with components slidably cooperable with components provided with components on the filter body to permit the filter body to slide with respect to the filter head in a direction lateral to the axis of the filter body between a first, disengaged position in which the filter body and filter head are separate, and a second, operative position in which the filter body is in a sealing engagement with the filter head, and wherein at least one of the filter body and the filter head has first and second flow path defining projections substantially perpendicular to the filter body axis and the other of the filter body and the filter head has corresponding first and second openings substantially perpendicular to the filter body axis and movement of the filter body to its second position causes the projections to engage the openings.

6. A filter arrangement as claimed in claim 5, further comprising valve means associated with the projections of at least one of the filter body and the filter head, the valve means closing upon movement of the filter body away from its second position.

7. A filter arrangement as claimed in claim 5, wherein the first and second flow path defining projections are arranged concentrically.

8. A filter arrangement as claimed in claim 5, wherein the components of the filter head and filter body comprise elongate recesses associated with one of the filter head and the filter body, and elongate projections associated with the other of the filter head and the filter body, the projections being received by the recesses, in use.

9. A filter arrangement comprising:

a filter head and a filter body, the filter head and filter body defining an axis, the filter head being provided with components slidably cooperable with components provided on the filter body to permit the filter body to slide with respect to the filter head in a lateral direction of the axis of the filter body between a first, disengaged position in which the filter body and filter head are separate, and a second, operative position in which the filter body is in sealing engagement with the filter head; and first and second flow path defining projections associated with the filter body and coaxial with corresponding projections associated with the filter head, movement of the filter body to its second position causing the projections of the filter body to engage those of the filter head, wherein the first and second flow path defining projections are arranged concentrically.

* * * * *